United States Patent Office 3,484,421
Patented Dec. 16, 1969

3,484,421
TWO STAGE HYDROGENATION PROCESS (II)
Lloyd Albert Pine, Karsten Herbert Moritz, and Henry George Ellert, Baton Rouge, La., assignors to Esso Research and Engineering Company, a corporation of Delaware
No Drawing. Filed July 20, 1965, Ser. No. 473,503
Int. Cl. C08f 15/42
U.S. Cl. 260—82                                      3 Claims

ABSTRACT OF THE DISCLOSURE

Petroleum resins are hydrogenated in two stages, using a palladium catalyst in the first stage and a nickel catalyst in the second stage. This accomplishes color removal without degradation to an unacceptably low softening point.

---

This invention relates to a method for the hydrogenation of resins from steam-cracked hydrocarbon fractions and more particularly relates to a method for producing a color stable product without degrading the softening point during said hydrogenation.

It is known to prepare resins from steam-cracked petroleum fractions by Friedel-Crafts polymerization at low temperatures and to hydrogenate the resulting product over a hydrogenation catalyst in the presence of a hydrocarbon solvent. The hydrogenation converts an otherwise highly colored and, thus for many uses, an undesirable product, into a low-colored commercially attractive product. However, with the mild hydrogenation conditions sufficient to remove the color, the hydrogenated product is color unstable because the reactive sites which are precursors of color bodies have not been removed. On the other hand, if the hydrogenation is carried out under conditions sufficiently severe to remove these sites, then the resin is degraded to an unacceptably low softening point.

In accordance with the present invention it has been discovered that the above difficulties can be avoided and a colorless and color stable product with good softening point obtained by carrying out the hydrogenation reaction in two stages using a palladium catalyst in the first stage and a nickel catalyst in the second stage.

The base resin which is to be hydrogenated in accordance with the present invention is prepared from certain unsaturated petroleum refinery streams which contain various mixtures of acyclic and cyclic olefins and diolefins by contact with a Friedel-Crafts type catalyst under relatively low temperatures, e.g. −150° to +200° F. The hydrocarbon mixtures obtained by steam cracking petroleum oils have been found to be especially useful for this purpose. These distillates are prepared by cracking petroleum fractions such as kerosene, gas oil, naphtha or residua in the presence of large amounts of steam, e.g. 50 to 90 mole percent, at temperatures of approximately 1,000 to 1,600° F. This steam cracking process is well known in the patented art and literature. The cracked liquid fraction ordinarily contains small amounts of cyclopentadiene monomers which are usually at least partially removed by thermal treatment of the fraction to cause dimerization of the cyclodiene. The cyclodienes may be left in the fraction if it is desired. These resins are useful for the preparation of floor tiles, in paints, for varnish manufacture or the like. In general, various steam cracked hydrocarbon streams such as described above and more particularly below may be employed. For example, a resin may be prepared from feed stocks having a relatively wide boiling range, e.g. 10° to 230° C., preferably 20 to 220° C., from which essentially all of the $C_4$ hydrocarbons and lighter hydrocarbons have been removed, although one may also use one or more narrower fractions such as the 40° to 150° C. fraction, the 150° to 230° C. fraction, etc. It is also sometimes advantageous to remove the isoprene from the naphtha. Typical analyses of such a wide steam cracked boiling fraction are shown in the following table:

TABLE I

Steam Cracked Naphtha Fraction Boiling Between 10° and 230° C.

| Component | Approximate Boiling Range, °C. | Specific Example, Vol. Percent | General Range (15–70° C.), Vol. Percent |
|---|---|---|---|
| $C_5$ Fraction | 10 to 65 | 33 | 10 to 40. |
| $C_6$–$C_8$ Fraction | 65 to 150 | 64 | 30 to 70. |
| $C_9$–$C_{12}$ Fraction | 150 to 230 | 5 | 0 to 25. |

Although the actual content of various chemical classes of hydrocarbons present may vary somewhat according to the type of crude oil from which the gas-oil fraction is being cracked and according to the steam cracking conditions and fractionating conditions; nevertheless, in general, a desirable, essentially debutanized, steam-cracked naphtha fraction boiling between 50° and 450° F. will have approximately the following range in composition:

|  | Percent by wt. |
|---|---|
| Aromatic hydrocarbons | 10–50 |
| Olefins | 30–70 |
| Unreactive paraffins | 0–5 |

A typical sample of such a fraction will consist essentially of about 5 to 20 weight percent benzene, about 5 to 15 weight percent toluene, about 0 to 25 weight percent of $C_9$ to $C_{12}$ aromatic hydrocarbons, about 5 to 15 weight percent of cyclodienes, about 10 to 15 weight percent aliphatic diolefins, about 15 to 60 weight percent of mono-olefins and about 0 to 5 weight percent unreactive paraffins.

Any of the above fractions are converted into resin by polymerization in the presence of a Friedel-Crafts catalyst, such as $AlCl_3$, $BF_3$, $SnCl_4$, $TiCl_4$, $AlBr_3$, etc. at a temperature of about −150° F. to +200° F., preferably 70 to 130° F. The resin thus produced becomes the feed to the second step of the process. In this step the resin is hydrogenated in the presence of a catalyst and a solvent.

Suitable solvents for use in the hydrogenation step include n-hexane and its various isomers, n-heptane, and the like.

It has been found that products of low color and acceptable softening point can be produced using any of the usual hydrogenation catalysts such as metals of Groups VI and VIII of the Periodic Table, e.g. nickel, palladium, platinum, nickel sulfides, copper chromite or cobalt molybdate which may be supported on light porous or other granular particles such as alumina, pumice, clay, charcoal, etc. However, in order to produce a product of good color stability it is necessary to remove much more of the residual unsaturation than is necessary to produce a low colored product. A difference in catalyst activity in this respect has been found. All the above mentioned catalysts have been found to remove color equally well, but palladium does not remove residual unsaturation effectively while nickel does. Unfortunately, however, nickel catalyst has excessive cracking activity and degrades the softening point of the resin.

According to the invention, therefore, it has been found possible to remove residual unsaturation and therefore improve the color stability of the resin while at the same time avoiding softening point degradation by carrying out the reaction in two stages using palladium on alumina in the first stage, and nickel on kieselguhr in the second.

The hydrogenation is effected under a pressure of about 100 to 5000 p.s.i.g., preferably about 500 to 3000 p.s.i.g., at temperatures of 100 to 750° F., preferably about 300 to 500° F. It may be conducted in a continuous process under a hydrogen flow rate of about 100 to 2000 standard cubic feet per barrel of resin with a liquid feed rate of 0.1 to 5, preferably 0.3 to 2 v./v./hr., i.e. volumes of liquid feed per volume of catalyst per hour. Alternately, the hydrogenation may take place in a batch process, maintaining an $H_2$ pressure of 500 to 3000 p.s.i.g. and a resin/catalyst ratio of 1/1 to 300/1, preferably 10/1 to 50/1.

The advantages and details of the invention will be better understood from the following examples.

EXAMPLE 1

The feed or raw material which was subjected to polymerization was made by steam-cracking a gas oil petroleum fraction derived from a paraffinic type crude, the cracking being carried out at a temperature of about 1300 to 1450° F. and pressure of 5 to 20 p.s.i.g. in the presence of about 70 to 80 mol percent of steam.

The approximate analysis of the resultant steam-cracked fraction, after debutanizing, was as follows:

|  | Volume percent |
|---|---|
| $C_5$ cyclodiolefins | 5 |
| Aliphatic $C_5$ diolefins | 5 |
| $C_5$ olefins | 20–21 |
| $C_6$–$C_8$ diolefins | 8–10 |
| $C_6$–$C_8$ olefins | 14–15 |
| $C_9$–$C_{12}$ diolefins | 3 |
| $C_9$–$C_{12}$ olefins | 4 |
| Benzene | 15 |
| Toluene | 10 |
| Xylenes | 2–3 |
| $C_9$–$C_{12}$ aromatics | 5–6 |
| Paraffins | 3 |

The above steam-cracked fraction was subjected to heat soaking and distillation to remove pentenes, isoprene, and cyclodienes to produce a feedstock with this approximate analysis:

|  | Volume percent |
|---|---|
| Pentenes | 4 |
| Isoprene | 2 |
| Piperylenes | 8 |
| Acetylenes | 1 |
| Cyclodienes | 2 |
| Benzene | 40 |
| Toluene | 10 |
| $C_6$–$C_8$ diolefins | 13 |
| $C_6$–$C_8$ olefins | 20 |

The product was then subjected to Friedel-Crafts polymerization at a temperature of 90 to 120° F. for a residence time of one hour with 1 wt. percent $AlCl_3$ catalyst based on feed. The polymerization was terminated by the addition of a 2:1 mixture, by volume, of water to isopropyl alohol. Inorganic halides resulting from catalyst decomposition were then removed from the resin solution by washing successively with warm water. The resulting resin solution was stripped under 3–5 mm. Hg to a maximum bottoms temperature of 520° F. to recover the resin product having a softening point of 110° C.

EXAMPLE 2

A sample of the resin of Example 1 was diluted with heptane to 20 wt. percent concentration and hydrogenated in the presence of a palladium catalyst at 400° F. and 500 p.s.i.g. in a continuous process at 2 volumes of resin solution per volume of catalyst per hour. A second run was made using nickel catalyst at 900 p.s.i.g. and 0.5 volume of resin solution per volume of catalyst per hour. The following data were obtained.

| | | Product Inspections | | |
|---|---|---|---|---|
| Catalyst | Conditions | Gardner Color | Type II Olefin moles/1,000 gms. | S.P. ° C. |
| | Feed | 10.0 | 1.3 | 107 |
| Pd | 400° F., 500 p.s.i.g., 2 v./v./hr. | 1.0 | .44 | 104 |
| Ni | 400° F., 900 p.s.i.g., 0.5 v./v./hr. | 1.5 | .17 | 93 |

The above data show that palladium catalyst used alone does not significantly degrade the softening point of the resin but is not very effective for reducing residual unsaturation. On the other hand, nickel catalyst alone does produce low residual unsaturation but causes severe softening point degradation under the necessary reaction conditions.

EXAMPLE 3

A sample of the resin of Example 1 was diluted to 20 wt. percent concentration and hydrogenated in a bomb, using in one instance palladium catalyst and in another nickel. In each case the run was carried out under 1000 p.s.i.g. and lasted for four hours. The following data were obtained:

| | | Product Inspection | | | |
|---|---|---|---|---|---|
| Catalyst | Conditions | Gardner Color | Type II olefins moles/1,000 gms. | Olefin Conversion percent | S.P. ° C. |
| | Feed | 10.0 | 1.3 | | 107 |
| Pd | 500° F., 1,000 p.s.i.g., 4 hours | 3.5 | .40 | 69 | 107 |
| Ni | 500° F., 1,000 p.s.i.g., 4 hours | 1.0 | 0.1 | 92 | 99 |

The data again show that the palladium catalyst does not degrade the softening point but gives poor olefin conversion, whereas the reverse is true for the nickel catalyst. A desirable, color stable resin has a softening point of better than 95° C. and an olefin content not exceeding .03 mole/1000 gms. Based on the above data it is easy to see that a two stage process utilizing palladium in the first stage and nickel in the second stage will yield a product which is color stable and have good softening point, whereas a two stage process employing a single catalyst only will not achieve this goal as shown in the following table.

| Catalyst | | Olefin Conversion (both stages) | Product | | | |
|---|---|---|---|---|---|---|
| | | | First Stage | | Second State | |
| First Stage | Second Stage | | Olefins, moles/1,000 gms | S.P., ° C. | Olefins, moles/1,000 gms | S.P., ° C |
| Pd | Pd | 69 | 0.40 | 107 | 0.124 | 107 |
| Ni | Ni | 92 | 0.1 | 99 | .008 | 91 |
| Pd | Ni | 69–92 | .40 | 107 | .03 | 99 |

The advantages of the present invention having thus been fully set forth and specific examples of the same given, what is claimed as new and useful and desired to be secured by Letters Patent is:

1. In a process for preparing a substantially water-white petroleum resin from a steam-cracked naphtha fraction boiling between about 50° to 450° F. having the following composition:

|  | Parts by wt. |
|---|---|
| Benzene | 5–20 |
| Toluene | 5–15 |
| $C_9$–$C_{12}$ aromatic hydrocarbons | 0–25 |
| Cyclic diolefins | 5–15 |
| Aliphatic diolefins | 10–15 |
| Aliphatic mono-olefins | 15–60 |
| Paraffins | 0–5 | which comprises subjecting said fraction to polymerization in the presence of a Friedel-Crafts catalyst at a temperature between −150° and +200° F. to polymerize the resin-forming constituents, and form a solution of resin in non-resin-forming constituents, separating the resin from the non-resin-forming constituents, dissolving the resin in a hydrocarbon solvent, and hydrogenating said solution in the presence of the hydrogenation catalyst, the improvement which comprises carrying out the hydrogenation at a pressure of about 100–5,000 p.s.i.g. and at a temperature of 100°–750° F., in two stages in the first of which the catalyst is palladium on alumina and in the second nickel of kieselguhr.

2. The process of claim 1 wherein the pressure is about 500–3,000 p.s.i.g. and the temperature is 300°–500° F.

3. The process of claim 2 wherein the pressure is 1,000 p.s.i.g. and the temperature is 500° F.

References Cited

UNITED STATES PATENTS

| | | | |
|---|---|---|---|
| 2,824,860 | 2/1958 | Aldridge et al. | 260—82 |
| 2,844,573 | 7/1958 | Gluesenkamp et al. | |
| 2,911,395 | 11/1959 | Small | 260—82 |
| 2,051,796 | 8/1936 | Humphrer | 260—96 |

OTHER REFERENCES

Berkman, Morrell & Egloff: Catalysis, Reinhold Publishing Corp., New York (1940), pp. 244 and 253–255 relied on.

JOSEPH L. SCHOFER, Primary Examiner

J. C. HAIGHT, Assistant Examiner

U.S. Cl. X.R.

260—96, 690